United States Patent [19]
Marshall

[11] 3,800,484
[45] Apr. 2, 1974

[54] AWNING FOR TRAVEL TRAILERS AND THE LIKE

[76] Inventor: Robert D. Marshall, 1010 Terrace Dr. N.W., Salem, Oreg. 97304

[22] Filed: July 20, 1972

[21] Appl. No.: 273,505

[52] U.S. Cl. ..................................... 52/69, 160/46
[51] Int. Cl. ..................... E04b 1/346, E04b 7/16
[58] Field of Search ............. 52/69, 68, 71, 74, 122, 52/73, 70; 160/54, 46, 61, 79, 80, 58, 69; 49/71, 63, 67; 135/5 A, 5 AT

[56] References Cited
UNITED STATES PATENTS

| | | | |
|---|---|---|---|
| 3,275,369 | 9/1966 | Ecke | 135/5 A X |
| 2,733,484 | 2/1956 | Jedlicka | 52/74 X |
| 2,890,498 | 6/1959 | Bigelow | 52/69 |
| 2,256,588 | 9/1941 | Beaman | 52/69 X |
| 2,720,415 | 10/1955 | Helvey et al. | 52/74 X |
| 2,811,935 | 11/1957 | Jones | 135/5 AT X |

Primary Examiner—Henry C. Sutherland
Attorney, Agent, or Firm—Oliver D. Olson

[57] ABSTRACT

A plurality of main awning panels are mounted on the side of a travel trailer or other mobile housing for pivotal and longitudinal adjustment, and an auxiliary awning panel is pivoted to the outer end of each main panel. Main telescoping legs are pivoted to the main panels for supporting the latter from the ground at various angles of adjustment relative to the mobile housing, and auxiliary telescoping struts interconnect the auxiliary panels and associated main legs for supporting the auxiliary panels in various angles of adjustment relative to the main panels. The auxiliary panels are foldable against the inner sides of the main panels, with the legs and struts interposed between them, for securing the assembly in folded condition against the side of the mobile housing.

9 Claims, 3 Drawing Figures

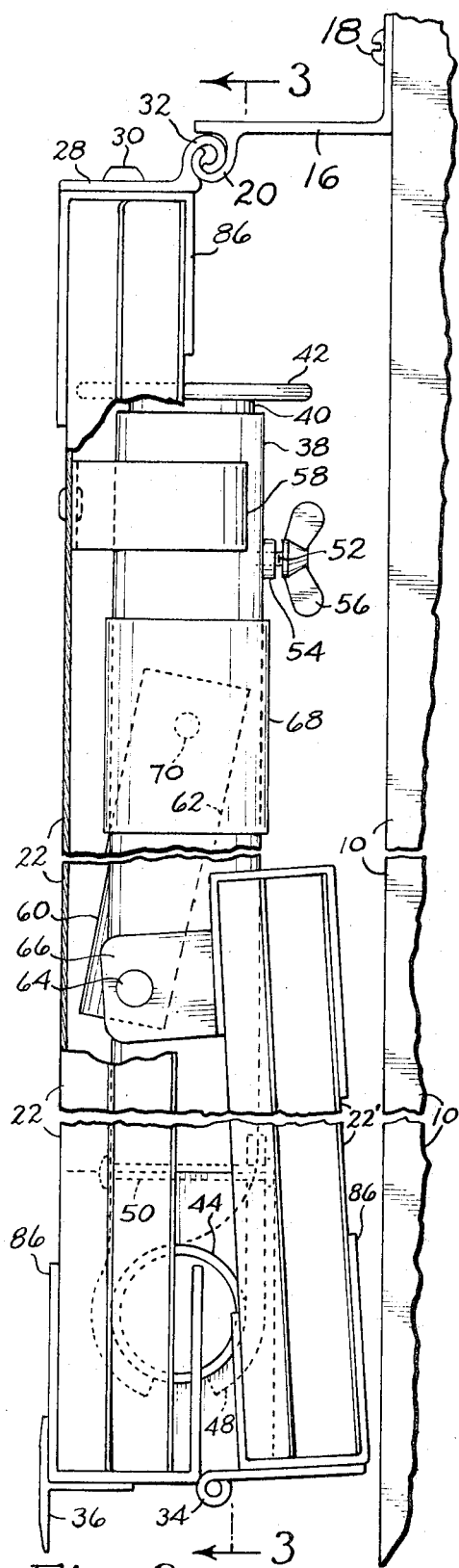
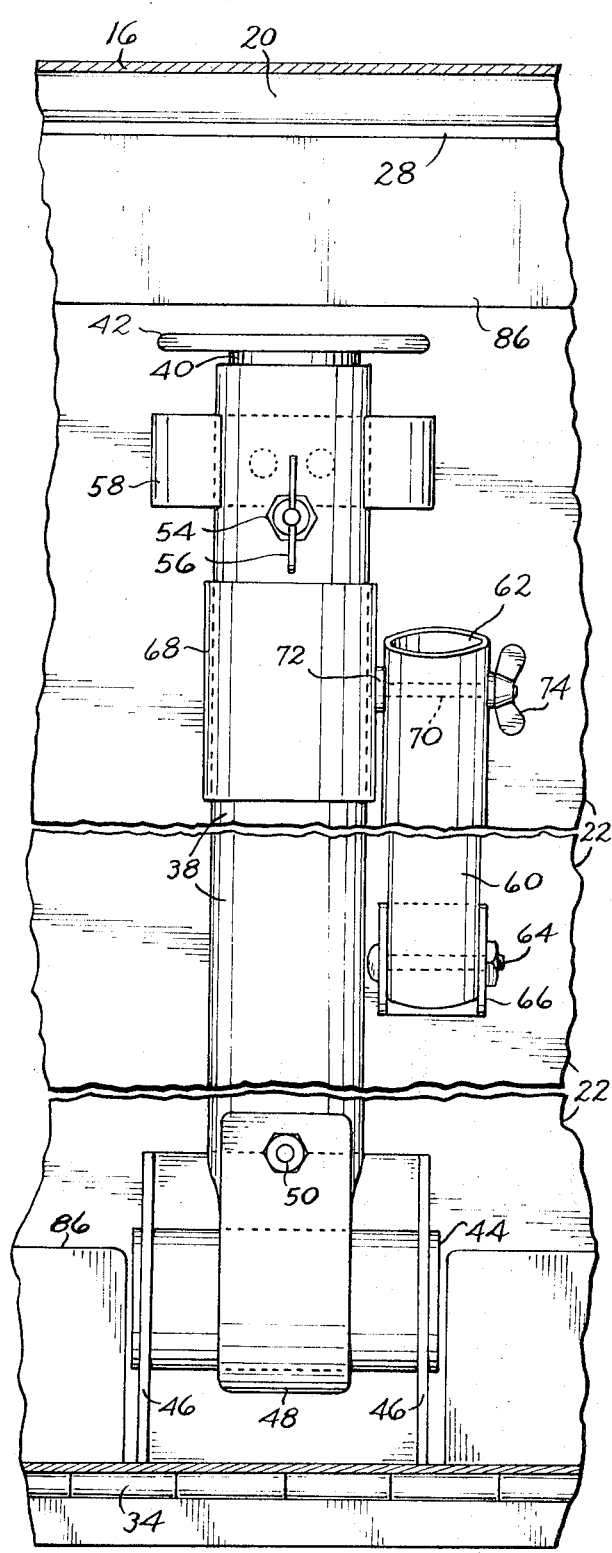
Fig. 2.
Fig. 3.

AWNING FOR TRAVEL TRAILERS AND THE LIKE

BACKGROUND OF THE INVENTION

This invention relates to awnings, and more particularly to an adjustable panel type awning assembly for mobile housings.

Awnings for campers, travel trailers, motor homes and like mobile housings have been provided heretofore in a variety of forms. Most are of the roll-up type which have a fixed angle of extension and are otherwise limited in their area of protection, and which are subject to excessive wear and deterioration. Others are of the panel type which are stored atop the housing when not in use and are swung outwardly to a fixed position of extension for support by separately stored legs. Still others of the panel type are stored within the housing when not in use and must be attached to the outer side of the housing in a fixed position of extension. These panel types are difficult to maneuver for assembly and disassembly, require internal storage for the separate parts and, like the roll-up type are limited in their versatility of use.

SUMMARY OF THE INVENTION

In its basic concept, the awning of this invention involves the mounting on the side of a housing of a main awning panel for pivotal adjustment, the main panel pivotally supporting an auxiliary panel, and telescoping legs and struts support the main and auxiliary panels in diverse positions of angular adjustment between full extension from and complete folding against the side of the housing.

It is by virtue of the foregoing basic concept that the principal objective of this invention is achieved; namely, to overcome the aforementioned disadvantages and limitations of prior awnings.

Another important object of this invention is the provision of an awning of the class described in which a plurality of sections thereof may be adjusted longitudinally and pivotally independently of each other to provide diverse areas of protection.

A further important object of this invention is the provision of an awning of the class described which may form a permanent part of a housing and may be constructed of materials which render it useful for the life of the housing with minimum maintenance and repair.

The foregoing and other objects and advantages of this invention will appear from the following detailed description, taken in connection with the accompanying drawings of a preferred embodiment.

BRIEF DESCRIPTION OF THE DRAWINGS

FIG. 2 is a fragmentary, foreshortened view in end elevation, as viewed from the right in FIG. 1, with portions broken away to disclose details of internal construction.

FIG. 3 is a fragmentary, foreshortened sectional view taken on the line 3—3 in FIG. 2.

DESCRIPTION OF THE PREFERRED EMBODIMENT

Figure 1:
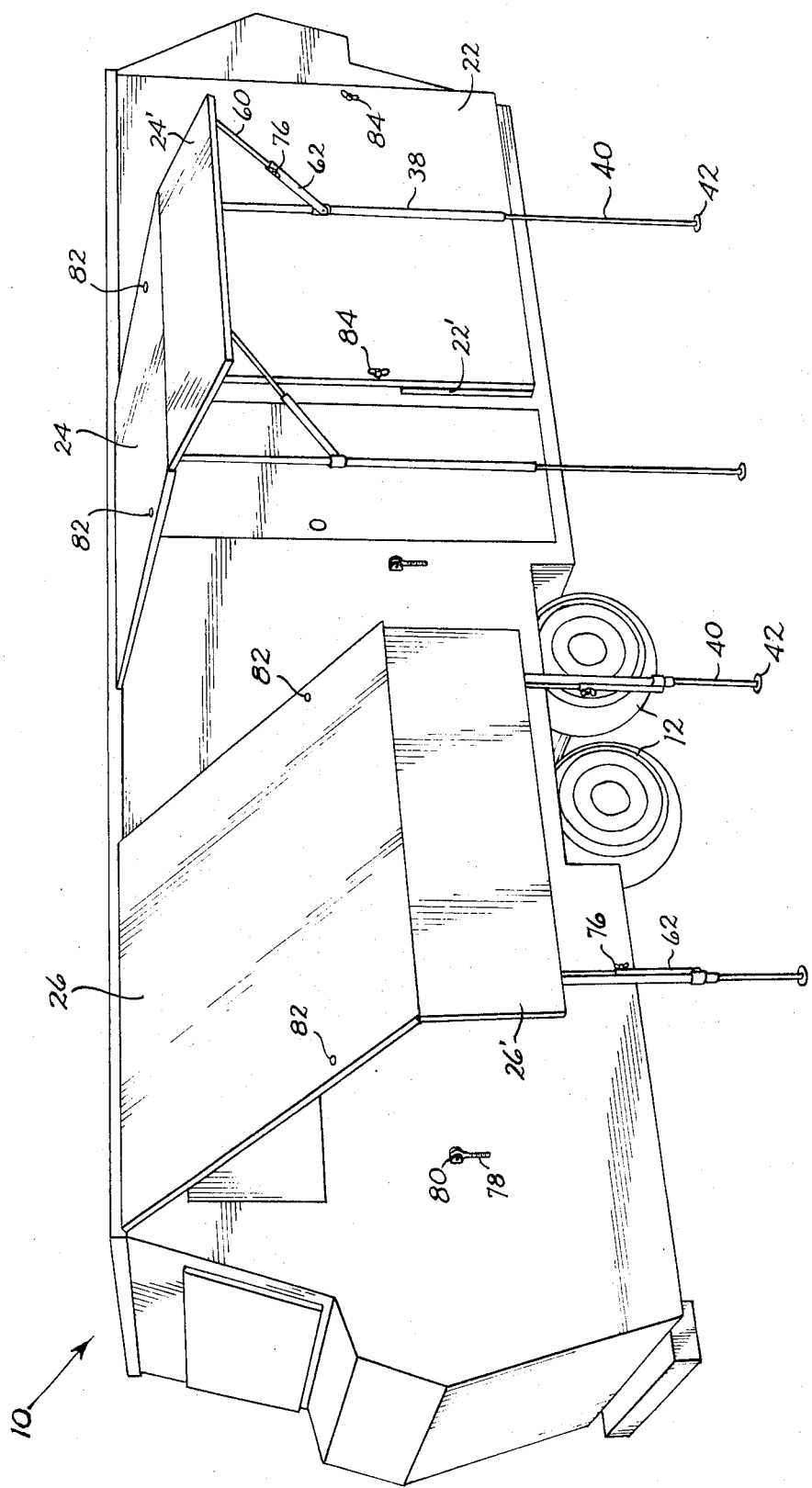
FIG. 1 is a perspective view of a travel trailer having mounted thereon an awning assembly embodying the features of this invention.

For purposes of illustration, there is shown in FIG. 1 a conventional type of travel trailer 10 supported for mobility on wheels 12. The rearward end of the trailer is to the left, and the right hand end of the trailer is provided with a hitch component, (not shown) for coupling to a towing vehicle, as will be understood. Further, a door 14 is provided in the side of the housing, in conventional manner.

In the illustrated embodiment of this invention, there is secured to the side of the housing, adjacent the top thereof and extending substantially the full length thereof, an elongated hanger bracket 16 (FIG. 2), secured to the housing by a plurality of longitudinally spaced screws 18. The outwardly projecting end of the bracket has a downwardly depending section which is curved arcuately upward to form an elongated track 20.

The track functions to support one or more awning sections for pivotal and longitudinal adjustment. In the embodiment illustrated in FIG. 1, there are three such awning sections. One includes main awning panel 22; the second includes main awning panel 24; and the third includes main awning panel 26. Each main panel is supported by the track independently of each other by means of a bracket 28 (FIG. 2) secured to the inner longitudinal edge of the main panel, as by screws 30. The inner longitudinal edge of the bracket is curved arcuately to form a coupling 32 which interlocks with the track 20 to prevent relative radial displacement while affording longitudinal and pivotal movement of the coupling relative to the track. In this manner the main awning panel may be slid along the track, either for removal from the housing or for adjustment to various longitudinal positions. The main awning panel also may be pivoted about the axis of the track to various angles relative to the side of the housing, as explained hereinafter.

The outer ends of the main awning panels pivotally support associated auxiliary awning panels 22′, 24′ and 26′, respectively, (FIG. 1), for relative angular adjustment. For this purpose a hinge 34 (FIG. 2), preferably of the piano type illustrated, interconnects the adjacent ends of the panels to allow pivoting of the auxiliary panel between folded position against the inner side of the main panel and a fully extended position projecting outward from the main panel in the same plane thereof.

In the fully extended position of the auxiliary panel, the confronting edges of the panels are sealed against the entrance of water from the upper sides thereof, by means of the elongated T-shaped weather seal 36 (FIG. 2), carried by the outer edge of the main panel.

Means is provided for supporting the outer end of each main panel at various angular positions of adjustment relative to the housing. For this purpose a pair of longitudinally adjustable, telescoping legs, each formed of an inner leg section 38 and an outer leg section 40 provided with a ground-engaging tip 42 are secured at their upper ends pivotally to the inner side of the main panel adjacent the opposite longitudinal ends thereof. In the embodiment illustrated, the inner leg section is of tubular construction, and the upper end thereof is flattened and bent arcuately to conform to the curvature of the pivot shaft 44 which is anchored to the inner side of the main panel by spaced brackets 46. A companion clamp plate 48, also curved on the same radius, is secured detachably to the leg section 38, by bolt 50, and functions with the curved end portion of the latter to confine the pivot shaft between them.

The outer leg section 40 is retained slidably within the inner section 38 and is secured in desired positions of extension by means of a set screw 52 (FIG. 2) which is threaded through a nut 54 welded to the outer side of the inner leg section and extends through a registering opening therein for abutment against the outer surface of the outer leg section 40. The outer end of the set screw preferably is provided with a wing nut 56 for convenience of manipulation.

The legs are foldable against the inner side of the main panel. Each leg is retained in the folded condition by such means as a spring clip 58 secured to the inner side of the panel by such means as rivets.

The auxiliary panels are adjustable angularly relative to their associated main panels. In the embodiment illustrated, each auxiliary panel is supported by a pair of telescoping struts each formed of an inner section 60 and an outer section 62. The projecting end of the inner strut section 60 is connected pivotally to the auxiliary panel, adjacent the side opposite the hinge 34, by means of a pivot pin 64 carried by a bracket 66. The opposite end of the outer strut section 62 is connected pivotally to a sleeve 68 mounted slidably on the inner main leg section 38. The pivot connection of the strut section to the sleeve preferably is provided by a set screw 70 which extends through aligned openings in the strut section and then is threaded through a nut 72 welded to the sleeve concentric with an opening in the sleeve. The inner end of the set screw thus may releasably engage the outer surface of the leg section 38, to secure the sleeve in desired positions of adjustment. The shank of the set screw functions additionally as a pivot for the strut section. The outer end of the set screw preferably is provided with a wing nut 74 for convenience of manipulation.

The telescoping strut sections 60 and 62 are connected together releasably by a set screw 76 in manner similar to the set screw 52 previously described. By this means the telescoping struts may be adjusted longitudinally to vary the angle of the auxiliary panel relative to the main panel.

The arrangement of struts and sleeves accommodates folding of the auxiliary panel against the inner side of the main panel, with the struts and legs interposed between them (FIG. 2). This is achieved by loosening the set screw 70 to allow the sleeve 68 to slide freely on the leg section 38 toward the outer end of the latter. The auxiliary panel thus is foldable to the position illustrated in FIG. 2. In this position the main panel hangs downward from the track 20 alongside the housing side wall, with the auxiliary panel interposed between the main panel and housing side wall.

Various means may be employed to secure the folded panel assembly against the side wall of the housing. In the embodiment illustrated, such means is provided by a pair of eye-bolts 78 (FIG. 1) associated with each main panel and secured pivotally to the housing side wall by brackets 80. Registering openings 82 in the main panel receive the eye-bolts outwardly therethrough. Wing nuts 84 then are applied to the projecting ends of the eye-bolts on the outer sides of the main panels, to secure the folded assembly firmly to the housing.

The awning panels may be constructed of any of a variety of materials. In the embodiment best illustrated in FIG. 2, the panels are constructed of a plurality of aluminum strips bent at their longitudinal edges to interlock and form weather-tight seals. The assembly of strips is secured together as a unit by perimeter channel members 86. This type of construction is well known in the art and forms no part of the present invention. However, this type of hollow construction is of advantage in this invention, since it provides internal space between the folded main and auxiliary panels for the interposition of the legs and struts. The panels preferably are constructed to match or otherwise compliment the structure and design of the housing side walls.

FIG. 1 illustrates but one of a wide variety of awning panel arrangements afforded by the structural assembly of this invention. In the arrangement illustrated, the forward panel assembly 22, 22' is folded and secured against the side wall of the housing. The middle awning assembly 24, 24' is positioned over the door 14. The telescoping legs are adjusted to a position in which the main panel 24 projects outwardly from the side wall at a slight pitch angle, and the struts are adjusted to extend the auxiliary panel 24' outwardly from the main panel at a slightly greater pitch angle.

The rearward panel assembly 26, 26' is displaced rearwardly from the center assembly and the legs are adjusted to support the main panel 26 at a substantial pitch angle. The struts are adjusted to support the auxiliary panel 26' in a vertical plane.

Since the track 20 allows longitudinal adjustment of the panel assemblies, the middle assembly may be moved rearward, when in folded condition, to expose the door 14 for use.

All three assemblies may be brought together and unfolded to any desired uniform arrangement, to provide a substantial area of uniform protection. Alernatively, one or more assemblies may be retained in folded condition or in any other desired position of extension, as will be apparent.

In the completely folded condition of all of the assemblies, preparatory to transport over the highway, the window areas of the side of the housing are protected against damage from flying rocks and other objects.

Although the embodiment illustrated provides three separate awning sections for association with a house trailer, it will be understood that a single awning section, or any desired number of additional sections may be provided. Further, the awning may be utilized with permanent housings, or with a wide variety of mobile housings such as campers, trucks, trailers and the like.

From the foregoing, it will be appreciated that the present invention provides an awning assembly which is of relatively simplified construction for economical manufacture, which may be utilized as a permanent part of a housing, which is folded and errected with speed and ease by a single individual, and which is versatile in its utility, being capable of adjustment to a wide variety of awning arrangements.

It will be apparent to those skilled in the art that various changes may be made in the size, shape, number, type and arrangement of parts described hereinbefore without departing from the spirit of this invention.

Having now described my invention and the manner in which it may be used, I claim:

1. An awning for a housing, comprising
 a a main panel,
 b means on one end of the main panel for mounting the latter on a housing for pivotal adjustment angularly relative to the housing between a folded position adjacent the side of the housing and an extended position outwardly thereof, c leg means secured pivotally at one end to the inner side of the main panel for adjustment between a folded position adjacent the inner side of the main panel and an extended position projecting from the main panel for engagement of the opposite end with the ground, d an auxiliary panel hinged to the outer end of the main panel for pivotal adjustment relative to the latter between a folded position adjacent the inner side of the main panel and an extended position outwardly of the main panel, and e strut means secured pivotally at one end to the auxiliary panel and at the opposite end adjustably to the leg means for securing the auxiliary panel in extended position, f the leg and strut means being arranged, upon folding of the panels, to be interposed between the main and auxiliary panels.

2. The awning of claim 1 including sleeve means mounted on the leg means for longitudinal adjustment relative thereto, pivot means securing said opposite end of the strut means to said sleeve means, and securing means releasably interengaging the sleeve means and leg means for securing the sleeve means to the leg means in selected positions of longitudinal adjustment.

3. The awning of claim 1 wherein the leg means comprises telescoping leg sections, and securing means releasably interengages the sections for securing them in selected positions of longitudinal adjustment.

4. The awning of claim 1 wherein the strut means comprises telescoping strut sections, and securing means releasably interengages the sections for securing them in selected positions of longitudinal adjustment.

5. The awning of claim 1 wherein the main panel mounting means comprises a bracket on the main panel, and track means engaging the bracket for pivotal and longitudinal adjustment of the latter relative to the track means, the track means being adapted to be secured to a housing.

6. The awning of claim 5 wherein the track means is substantially longer than the corresponding dimension of the main panel, whereby to accommodate the mounting of a plurality of main panels thereon for independent adjustment.

7. The awning of claim 1 including means on the main panel adapted to engage the side of the housing for securing the main panel to the housing when in folded position.

8. The awning of claim 1 wherein a the leg means comprises telescoping leg sections, and securing means releasably interengages the sections for securing them in selected positions of longitudinal adjustment, b the strut means comprises telescoping strut sections, and securing means releasably interengages the sections for securing them in selected positions of longitudinal adjustment, and c sleeve means is mounted on the inner leg section for longitudinal adjustment relative thereto, pivot means secures said opposite end of the strut means to said sleeve means, and securing means releasably interengages the sleeve means and leg section for securing the sleeve means to the leg section in selected positions of longitudinal adjustment.

9. The awning of claim 8 wherein the main panel mounting means comprises a bracket on the main panel, and track means engaging the bracket for pivotal and longitudinal adjustment of the latter relative to the track means, the track means being adapted to be secured to a housing, the track means being substantially longer than the corresponding dimension of the main panel, whereby to accommodate the mounting of a plurality of main panels thereon for independent adjustment.

* * * * *